US009882864B1

(12) United States Patent
Leonard (10) Patent No.: US 9,882,864 B1
(45) Date of Patent: Jan. 30, 2018

(54) TRACE ROUTE AUDIT AND ALARMING (71) Applicant: Sprint Communications Company L.P., Overland Park, KS (US)

(72) Inventor: Mark D. Leonard, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 175 days.

(21) Appl. No.: 14/945,060

(22) Filed: Nov. 18, 2015

(51) Int. Cl.
*H04L 12/58* (2006.01)

(52) U.S. Cl.
CPC .............. *H04L 51/34* (2013.01); *H04L 51/24* (2013.01)

(58) Field of Classification Search
None
See application file for complete search history.

(56) References Cited

U.S. PATENT DOCUMENTS

| | | | |
|---|---|---|---|
| 7,136,642 B1 * | 11/2006 | Massie | H04W 24/00 455/428 |
| 8,355,316 B1 * | 1/2013 | Lushear | H04L 43/0817 370/217 |
| 8,578,048 B2 * | 11/2013 | Kiefer | H04L 41/00 370/351 |
| 2003/0009553 A1 * | 1/2003 | Benfield | H04L 41/0213 709/224 |
| 2008/0298235 A1 * | 12/2008 | Neugebauer | H04L 43/0864 370/232 |
| 2010/0103822 A1 * | 4/2010 | Montwill | H04L 41/0645 370/242 |
| 2014/0189442 A1 * | 7/2014 | DeGraaf | G06F 21/554 714/48 |
| 2017/0054623 A1 * | 2/2017 | Amulothu | H04L 43/10 |

* cited by examiner

*Primary Examiner* — Thomas Dailey (57) ABSTRACT

A method of trace route auditing and alarming for message queuing middleware. The method comprises transmitting, by a server computer in the message queuing middleware system that implements message queuing services, a trace route message requesting an activity report to a partner computer, receiving, by the server computer, the activity report comprising message activity information from the partner computer, and comparing, by an application executing on the server computer, the most recent message activity information with message activity records to detect changes in message activity, wherein the application is stored in a memory of a computer and is executed by a processor of the computer. The method further comprises responsive to message activity changes being detected, determining by the application a cause of activity change based on the comparison.

20 Claims, 5 Drawing Sheets

TRACE ROUTE AUDIT AND ALARMING

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Large business enterprises typically benefit from reliable and secure optimal communications both within the enterprise and with clients, partners and suppliers around the globe via the Internet. Middleware helps enterprises achieve this goal by integrating applications on different platforms or with diverse technologies. Asynchronous communication with a message queuing mechanism may ensure reliable communications among different parties. Message queues typically receive, store, and forward messages and requests for information and services. Message queuing is a method of process-to-process or application-to-application communication, such as communication between an application that services a user and an application that retrieves data from a database. Message queuing middleware implements various components to realize message queuing services. Applications may communicate by writing and reading application-specific data, or messages, to and from queues, without having a dedicated synchronous link between the applications. The asynchronous feature of the message queuing middleware allows the application to continue processing after making a middleware service request.

SUMMARY

In an embodiment, a method of trace route auditing and alarming for message queuing middleware is disclosed. The method comprises transmitting, by a server computer in the message queuing middleware system that implements message queuing services, a trace route message requesting an activity report to a partner computer, receiving, by the server computer, the activity report comprising message activity information from the partner computer, and comparing, by an application executing on the server computer, the most recent message activity information with message activity records to detect changes in message activity, wherein the application is stored in a memory of the server computer and is executed by a processor of the server computer. The method further comprises responsive to message activity changes being detected, determining by the application a cause of activity change based on the comparison, and performing by the application at least one of restarting a stopped message channel, resetting a message channel sequence number, resolving the message channel, or pinging the message channel based on the determined cause of activity change.

In an embodiment, a method of trace route auditing and alarming for message queuing middleware is disclosed. The method comprises transmitting, by a server computer in the message queuing middleware system that implements message queuing services, a trace route message requesting a trace route reply message to a partner computer, receiving, by the server computer, a trace route reply message comprising message activity information from the partner computer, storing activity information into message activity records, and comparing, by an application executing on the server computer, the most recent message activity information with activity records to detect changes in message activity. The method further comprises responsive to message activity changes being detected, determining by the application a cause of activity change based on the comparison, and responsive to the cause of activity change being a stopped message channel, restarting by the application the message channel.

In an embodiment, a method of trace route auditing and alarming for message queuing middleware is disclosed. The method comprises transmitting, by a server computer in the message queuing middleware system that implements message queuing services, a trace route message requesting an activity report to a partner computer, receiving, by the server computer, the activity reports comprising message activity information from the partner computer, and comparing, by an application executing on the server computer, message activity information with message activity records to detect changes in message activity. The method further comprises responsive to message activity changes being detected, determining by the application a cause of activity change based on the comparison, and notifying by the application administrative staff of the determined cause.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

A wireless communication service provider may communicate with a third party through a message queuing system. For example, the wireless communication service provider may transmit authentication and billing related information to a third party billing platform such as an AMDOCS server, and the AMDOCS server may transmit processed billing information back to the wireless communication service provider through the message queuing system. In this case, the message queuing topology bridges out the wireless service provider network into the third party company/organization. The message queuing system may stop working suddenly after years of operation without issues. This may be caused by a variety of factors, for example an alias queue name changed by a third party, wrong definition or configuration of queues, accidentally deleted objects, unauthorized change of objects in the message queuing system, etc. For example, administrators on the third party end may make changes that mistakenly break the message channel, for instance by changing a port number on a router that couples the third party to the network.

A mechanism to automatically detect and correct configuration errors throughout the message queuing topology, repair the message queuing system, and/or alarm corresponding personnel may be beneficial. Trace route is a function provided by at least some types of message queuing middleware and may be utilized by the mechanism to detect errors or changes in the message queuing system. The present disclosure teaches a system and method for auditing trace route messages and correcting and alarming trace route errors.

For example, an audit application may be stored in a memory of a server computer and executed by a processor of the server computer. The server computer may be supported and maintained by the wireless communication service provider. The audit application may comprise a monitor component and an action component. The audit application may be executed or invoked by an operating system of the server computer periodically (e.g., as a daemon process launched by a Cron utility provided by the operating system), for example at 6 am every day when the internet traffic or messaging traffic is low, to examine a list of remote queue definitions for a given queue manager. A third party may update its system early in the morning with changes that may cause issues to the message queuing system. Hence, in an embodiment, the audit application may execute at 6 am every day to minimize the time a failure may persist and to repair the message queuing system before the day's business communications ramp up significantly.

The monitor component may call a trace route function provided by a message queuing middleware system to transmit a trace route message for each of at least part of the whole list of the remote queue definitions and monitor the steps of the trace route messages. For example, the monitor component may examine trace route reply messages or message activity reports for the trace route messages to examine the steps of the trace route message. The monitor component may also scan an error log of the trace route function to detect errors with the trace route message activity. The action component may take action to repair the message queuing system when detecting errors and/or changes in message activity based on analyzing results provided by the monitor component.

To be specific, the monitor component may call another application such as the trace route function provided by the message queuing system to transmit a trace route message for each of at least some of all the remote queue definitions associated with a given queue manager. The trace route message may be configured to request activity reports or a trace route reply message, for example configured in a parameter. The activity report and the trace route reply message may each comprise message activity information. Message activity information may be recorded in message activity records by the trace route function or by the audit application. Upon receipt of the activity report or the trace route reply message, the monitor component may compare the most recently received message activity information with message activity records to detect errors, changes, and/or time delays in message transmission.

When abnormal message activity behavior such as errors, changes, and/or time delays are detected, the monitor component may determine a cause of the abnormal activity behavior based on the comparison and/or the message activity information. For example, the monitor component may examine the status of each step along the transmission route of the trace route message and/or record the status of each step in the message activity records. For instance, the monitor component may examine the message activity information to determine where the trace route message last stopped in case of trace route message delivery error.

The action component may then perform a variety of actions such as restarting a stopped message channel, resetting a message channel sequence number, resolving the message channel, or pinging the message channel to correct an error or change that caused the abnormal activity based on the determined cause of activity change. For example, when the cause of activity change is a stopped message channel, the action component may restart the message channel. When an error in message activity is detected and the comparison of the current activity information and activity records indicates that a message channel sequence number is wrong, the action component may reset the message channel sequence number.

When the message channel is still not operational after the above action, the action component may ping the message channel via the message queuing middleware command ping channel. Ping channel is a command that would determine what the problem is in some cases. When the most recent message activity information indicates that the message channel should be resolved, the action component may resolve the message channel by forcing a commit or backing out the last batch of messages. When the cause of activity change is a non-resolvable message channel, the action component may reroute the message channel. A map with alternative routes may be built and referenced to for rerouting the message channel.

If the above automatic action fails to correct the error, human intervention may be desired. The action component may achieve this by transmitting notification to corresponding personnel after a series of automatic action has failed and/or under predefined circumstances. For instance, when the error may be caused by configuration at the remote side or the third party side, the action component may transmit a notification to the third party server. The notification may not be transmitted through the message queuing system but instead may be transmitted by some other communication system. For example, when a trace route message is not received by a destination queue manager, the action component may notify the corresponding remote administrative staff of the destination queue manager issue. When a trace route message is received by a remote queue manager but fails to be written to a remote side queue, the action component may notify the remote administrative staff of a potential configuration issue.

When a message is written to a different destination queue than before, the action component may notify the staff associated with the current destination queue that the message is written to. Alternatively, when a message is written to a different destination queue than before, the action component may simply record the event for future reference.

The action component may further check with the staff associated with the current destination queue to check whether any unauthorized change has been made to the destination queue name. In an embodiment, the sending message queue manager may transmit messages to a remote side queue as an alias queue, and the base queue that the alias queue resolves to may be changed, for example by the third party. Thus, a message may be written to a different destination queue than before when the base queue of an alias queue has been changed. When a message fails to be placed into a local transmission queue, the action component may notify the local administrative staff of the local configuration error. Additionally, when message fails to be sent over a message channel, the action component may notify the local and/or remote administrative staff of the message channel issue. Accordingly, the mechanism in the present disclosure may audit trace route messages and correct and alarm trace route errors.

Figure 1:
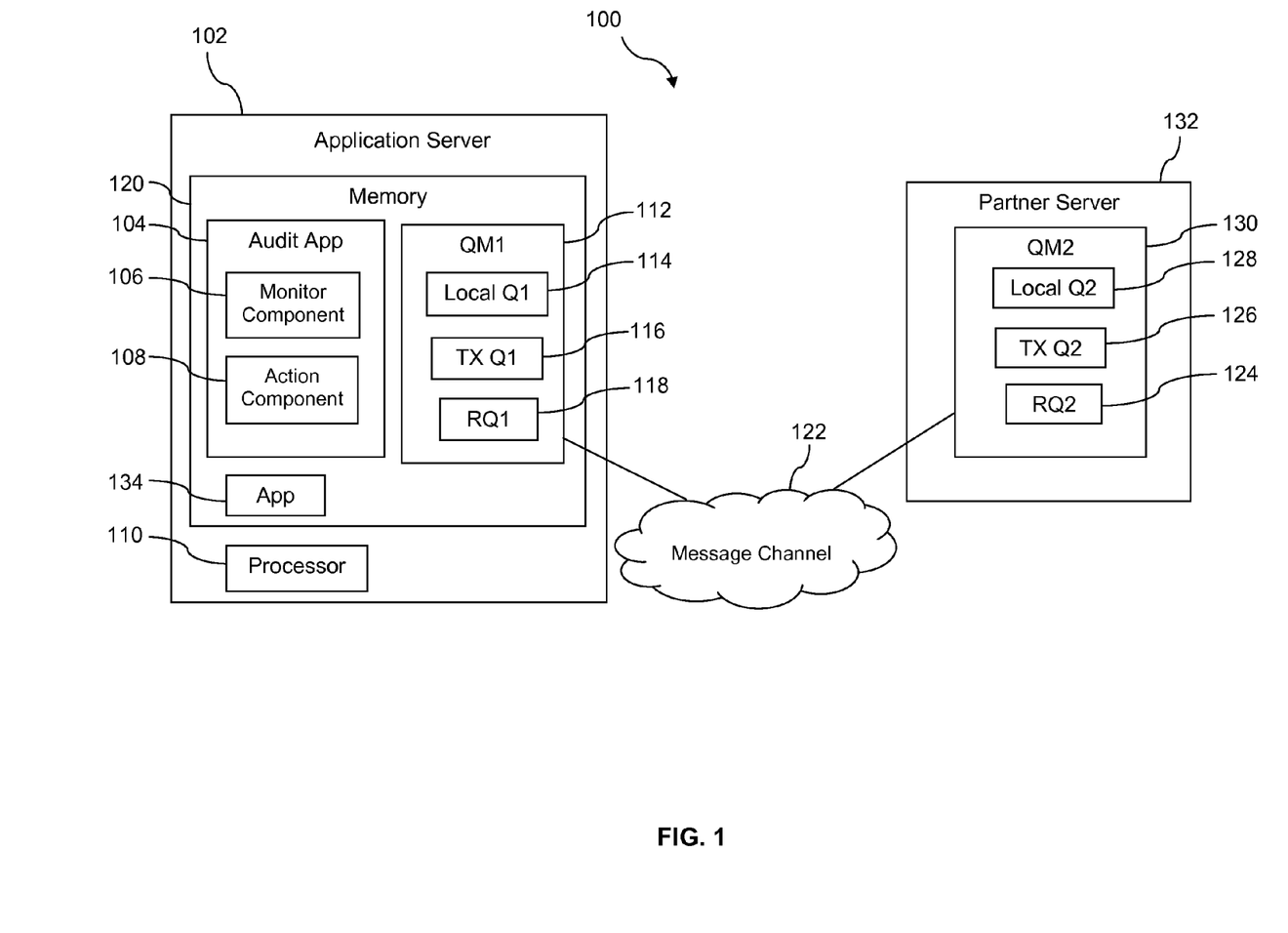
FIG. 1 is an illustration of a communication system according to an embodiment of the disclosure.

Turning now to FIG. 1, a message queuing system 100 is described. In an embodiment, the system 100 comprises an application server 102 and a partner server 132. The application server 102 may be a server supported by a wireless communication service provider and the partner server 132 may be a server supported by a partner or a third party organization that communicates with the wireless communication service provider through the message queuing system. In an embodiment, the partner server 132 may be an AMDOCS server. The application server 102 may comprise a processor 110 and a memory 120. The memory 120 may comprise an audit application 104, a queue manager1 (QM1) 112, and an application 134. The QM1 112 may be for example, an IBM WebSphere MQ queue manager, Java Message Service (JMS) queue manager, Amazon simple queue service queue manager, or some other type of queue manager.

The audit application 104 may comprise a monitor component 106 and an action component 108. The QM1 112 may comprise a local queue1 (local Q1) 114, a transmission queue1 (TX Q1) 116, and a remote queue definition1 (RQ1) 118. A queue manager such as the QM1 112 may comprise more than one local queue, more than one transmission queue, and/or more than one remote queue definition. The partner server 132 may comprise a queue manager2 (QM2) 130. The QM2 130 may comprise a local queue2 (local Q2) 128, a transmission queue2 (TX Q2) 126, and a remote queue definition2 (RQ2) 124.

The QM1 112 may transmit messages that are generated by the application 134 to the local Q2 128 through the RQ1 118, the TX Q1 116, a first message channel agent (MCA) (not shown) of the QM1 112, a message channel 122, and a second MCA (not shown) of the QM2 130. The QM1 112 may store messages into the TX Q1 116 before transmitting the messages. When a message from the application 134 is directed to a receiver application (not shown) on the partner server 132, the message stored on the application server 102 may be retrieved by the QM2 130 through the second MCA and the local Q2 128 on the partner server 132. A message channel agent is a software entity that reads messages from a transmission queue and sends them across a message channel to another message channel agent. In other words, a message channel connects two queue managers via message channel agents. The message channel 122 may be implemented at an application layer of processing on top of a communication network infrastructure. The communication network infrastructure may comprise any combination of private and public networks and may employ any communication protocol such as example transmission control protocol and internet protocol (TCP/IP).

It is understood that the message queuing system 100 may comprise any number of the application servers 102 and any number of the partner servers 132. The application server 102 and the partner server 132 may be two different computers or one and the same computer. In other words, an AMDOCS server computer may be an internal computer in the wireless communication service provider network. The application 134 may be any application that may desire to communicate with another application. As mentioned above, for example, the application 134 may be an authentication and billing enforcement application from a wireless communication service provider and the another application that the application 134 desires to communicate with may be a billing application from a third party billing platform such as AMDOCS.

In an embodiment, a remote queue definition is the definition on the local queue manager of queues that belong to another queue manager. In order to send a message to a queue on a remote queue manager, the sending queue manager defines a remote definition of the target queue. For example, the RQ1 118 is the definition on the QM1 112 of the target queue—the local Q2 128—on the remote queue manager, the QM2 130. Thus, the RQ1 118 may comprise identification information of the local Q2 128. In other words, the RQ1 118 is entailed for the QM1 112 to transmit messages to the local Q2 128. Similarly, the RQ2 124 may be the definition on the QM2 130 of the local Q1 114 of the QM1 112.

In an embodiment, a transmission queue such as the TX Q1 116 may be a data structure that stores messages until the messages are retrieved by the applications that service the queue. In other words, the QM1 112 may accumulate messages to be transmitted to the QM2 130 on the TX Q1 116 until the messages are retrieved by the QM2 130 or more specifically the message channel agent associated with the QM1 112.

A local queue such as the local Q2 128 may be a definition of both a queue and the set of messages that are associated with the queue. The queue manager—in this case the QM2 130—that hosts the queue receives messages in its local queues such as the local Q2 128. Thus, when the QM1 112 transmits a message to the QM2 130, the QM2 130 may receive the message in the local Q2 128.

The audit application 104 may be stored in the memory 120 of the application server 102. When executed by the processor 110 of the application server 102, the audit application 104 may perform a variety of functions to audit trace route and alarm corresponding administrative personnel for issues related to trace route. The audit application 104 may be executed or invoked by an operating system of the application server 102 periodically (e.g., as a daemon process launched by a Cron utility provided by the operating system), for example every day, every two days, every week, or at some other periodic interval, to examine a list of remote queue definitions for a given queue manager such as the QM1 112. In an embodiment, the audit application 104 may be executed at 6 am every day—right after applications on the partner server 132 have been updated and when the messaging traffic is low to detect errors and repair the message queuing system before the day starts.

The audit application 104 may call a trace route command or transmit a trace route message, monitor the trace route message, examine the trace route message route, record trace route message activity, compare the most recent message activity with message activity records, detect errors, changes, or time delays in the most recent message transmission based on the comparison, and/or alarm corresponding personnel in case of errors, changes, or time delays in message transmission. When monitoring the trace route message and examining the message route, the audit application 104 may monitor which transmission queue the trace route message is transmitted from, which message channel the trace route message is transmitted across, which destination queue manager the trace route message is transmitted to, whether the destination queue manager receives the message, whether the message is written to the destination queue, and/or another step along the message transmission route. The audit application 104 may comprise a special conduit or connection (e.g., an application programming interface (API)) to the QM1 112 to examine activity records, to scan error logs, for corrective action, etc. The audit application 104 may execute under an administrator account such as a queue manager type account, especially for corrective action.

The monitor component 106 of the audit application 104 may call the trace route application and monitor steps of the trace route message. For example, the monitor component 106 may call the trace route command provided by the message queuing middleware to transmit a trace route message for remote queue definition(s) of the QM1 112. In other words, the monitor component 106 may transmit through a trace route command a trace route message with a target destination the same as the target queue in a remote queue definition for the remote queue definition(s) of the QM1 112. Trace route messages may be transmitted to cover routes over which regular messages in the message queuing system are transmitted. The monitor component 106 may examine trace route reply messages or message activity reports of the trace route messages and extract message activity information from the trace route reply messages and message activity reports. The monitor component 106 may scan an error log generated by the trace route application. The action component 108 may take action to fix the message queuing system when detecting errors, changes, and/or time delays in message activity based on analyzing results provided by the monitor component 108.

To be specific, the monitor component 106 may transmit a trace route message through the trace route command provided by the message queuing middleware for a remote queue definition associated with a given queue manager such as the QM1 112. The monitor component 106 may transmit through the trace route command a trace route message with a target destination the same as the target queue in a remote queue definition. The monitor component 106 may transmit one trace route message for each of a whole list or part of the whole list of remote queue definitions associated with the QM1 112. The trace route message may be configured, for example with a parameter value, to request activity reports or a trace route reply message. The activity report or the trace route reply message may comprise message activity information of the associated trace route message. Message activity information comprised in the activity report or the trace route reply message may be recorded or stored by the monitor component 106 or another application, for example in message transmission records.

Upon receipt of the activity report or the trace route reply message, the monitor component 106 may compare the most recent message activity information comprised in the activity report or the trace route reply message with message transmission records to detect abnormal behavior in message activity such as errors, changes, and/or time delays. The message transmission records may be analyzed to determine averages or medians that may be used to perform this comparison, for example a windowed average or windowed median determined over a delimited recent window of time (e.g., over a window of the most recent week, the most recent month, or over the last quarter).

When abnormal behavior is detected in the most recent message activity, the monitor component 106 may determine a cause of the abnormal behavior based on the comparison of the most recent message activity information and/or the message activity reports. For example, the monitor component 106 may examine status of each step along the route of the trace route message and/or compare it with status records of previous trace route messages. Each step along the route may be associated with its own timestamp. Thus, errors and/or time delay change may be determined based on the timestamps of steps. For instance, the monitor component 106 may examine the message activity information to determine where the trace route message has stopped when an issue is detected during delivery of the trace route message. In another example, the monitor component 106 may detect a change in the destination queue when comparing the message activity information with message activity records associated with messages from the same application 134. In a third example, the monitor component 106 may detect a time delay in delivering a trace route message when comparing the most recent message activity information with message activity records.

When evidence of abnormal behavior has been detected in the trace route message, the action component 108 may perform a variety of functions to solve the issue or transmit notification to corresponding personnel. The action component 108 may perform functions such as restarting a stopped message channel 122, resetting a message channel 122 sequence number, resolving the message channel 122, pinging the message channel 122, or some other function to solve the issue that caused the abnormal behavior. For example, when the cause of abnormal behavior is a stopped message channel 122, the action component 108 may restart the message channel 122. When the activity comparison indicates that a message channel 122 sequence number is wrong, the action component 108 may reset the message channel 122 sequence number. When the message channel 122 is still not operational after the above action, the action component 108 may ping the message channel 122 via the message queuing middleware command ping channel. In an embodiment, ping channel is a command that would help identify what the issue is in most cases.

When the most recent message activity information indicates that the message channel 122 should be resolved, the action component 108 may resolve the message channel 122. The action component 108 may resolve the message channel 122 by forcing a commit or backing out the last batch of messages. When messages are committed, they may be deleted from the transmission queue. When messages are backed out, they may be restored to the transmission queue. When the cause of activity error, change, or time delay is a non-resolvable message channel 122, the action component 108 may reroute the message channel 122. A map with alternative routes may be built for this purpose and may be referenced to for rerouting the message channel 122.

When the above automatic functions fail to fix the issue or under other predefined circumstances, human intervention may be desired. The action component 108 may introduce human intervention to solve issues of the message queuing system 100 by transmitting notification to corresponding personnel. For example, when a message fails to be placed into a local transmission queue such as the local TX Q1 116, the action component 108 may notify administrative team of the local configuration issue. When a message fails to be sent over a message channel 122, the action component 108 may notify the administrative team of the message channel 122 issue. When a message is not received by a destination queue manager, the action component 108 may notify corresponding remote administrative staff of the queue manager issue.

When a message is received by a remote queue manager but fails to be written to a remote side queue, the action component 108 may notify corresponding remote administrative staff of a potential configuration issue. The cause of this issue may be that the RQ1 118 is not correctly configured, that an associated object used by this route is deleted by the third party, and/or that a wrong target queue name is provided. When a message is written to a different destination queue than before, the action component 108 may notify the team associated with the current destination queue that the message is written to or simply record the event for future reference. The action component 108 may further check with the team associated with the current destination queue to assure there has been no unauthorized change to the destination queue name.

Figure 2:
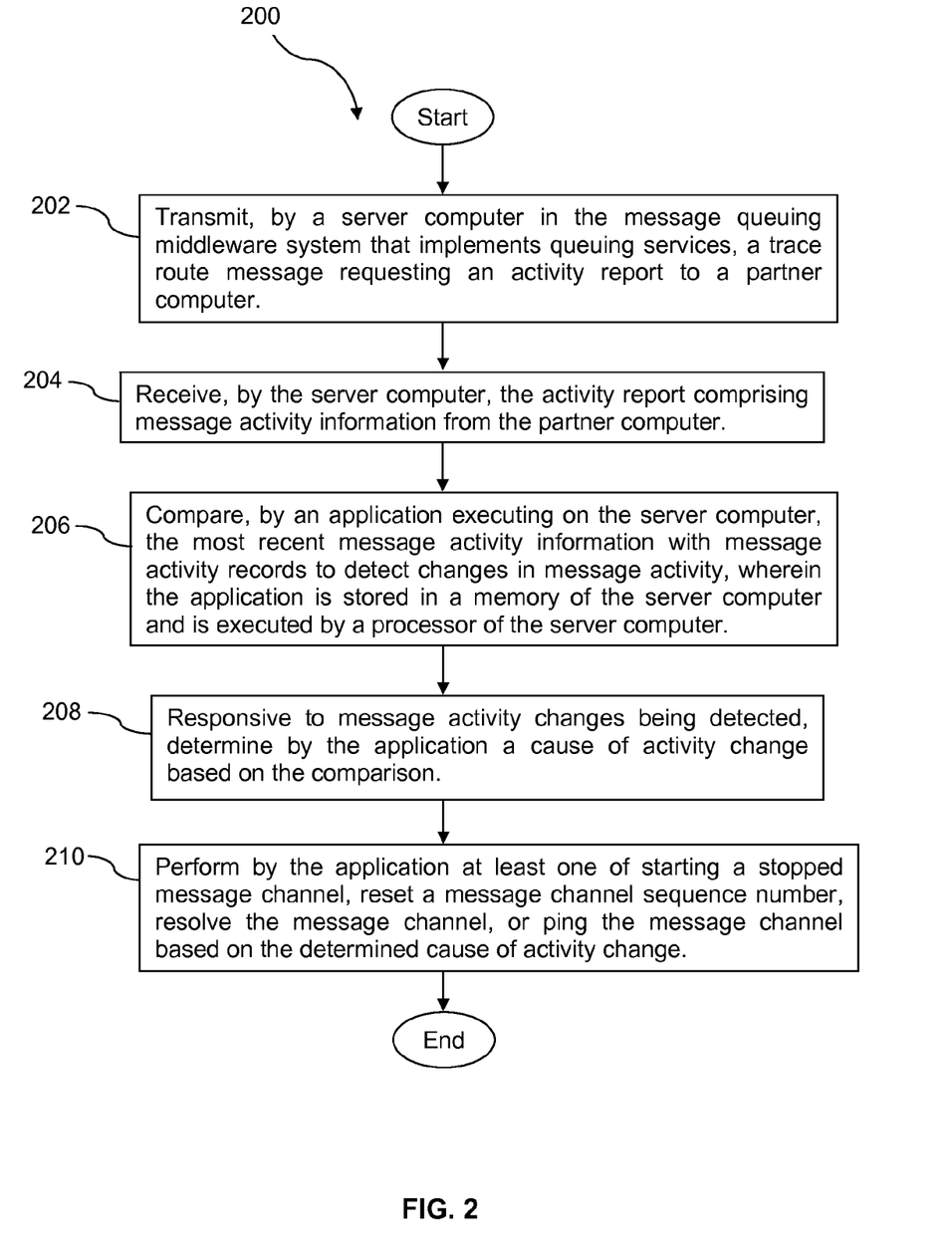
FIG. 2 is a flow chart illustrating a method according to an embodiment of the disclosure.

Turning now to FIG. 2, a method 200 is described. At block 202, a trace route message is transmitted requesting activity reports to a partner computer by a server computer in the message queuing middleware system that implements various components to realize message queuing services. For example, a trace route message may be transmitted by the monitor component 106 via calling the trace route function provided by the message queuing middleware. The trace route message may be configured to request activity reports. Activity reports may be transmitted to a reply queue of the QM1 112, e.g., the local Q1 114, by entities along the route of the trace route message.

In an embodiment, the trace route function or a message queue display route function (also provided by the message queuing middleware) may transmit an activity report to the local Q1 114 of the sending queue manager, the QM1 112, when the trace route message placed in the transmission queue, the TX Q1 116, is transmitted. When the trace route message leaves an entity further down along the transmission route, e.g., the sending side message channel agent, the receiving side message channel agent, the entity may transmit an activity report to the reply queue, the local Q1 114, of the sending queue manager. The activity report may comprise activity information of the trace route message associated with the entity. For example, the activity report may comprise an arrival timestamp of the trace route message at the entity, a departure timestamp of the trace route message at the entity, a sending queue manager identity, a channel message identity, and/or a receiving queue manager identity.

At block 204, the activity report comprising message activity information is received by the server computer. As mentioned above, the activity report comprising message activity information may be received by the application server computer 102 at the local Q1 114. At block 206, the most recent message activity information is compared by the audit application 104 with message activity records to detect changes in message activity, wherein audit the application 104 is stored in the memory 120 of the application server computer 102 and is executed by the processor 110 of the application server computer 102.

At block 208, responsive to message activity changes being detected, a cause of activity change is determined based on the comparison. At block 210, at least one of restarting a stopped message channel, resetting a message channel sequence number, resolving the message channel, or pinging the message channel is performed based on the determined cause of activity change.

Figure 3:
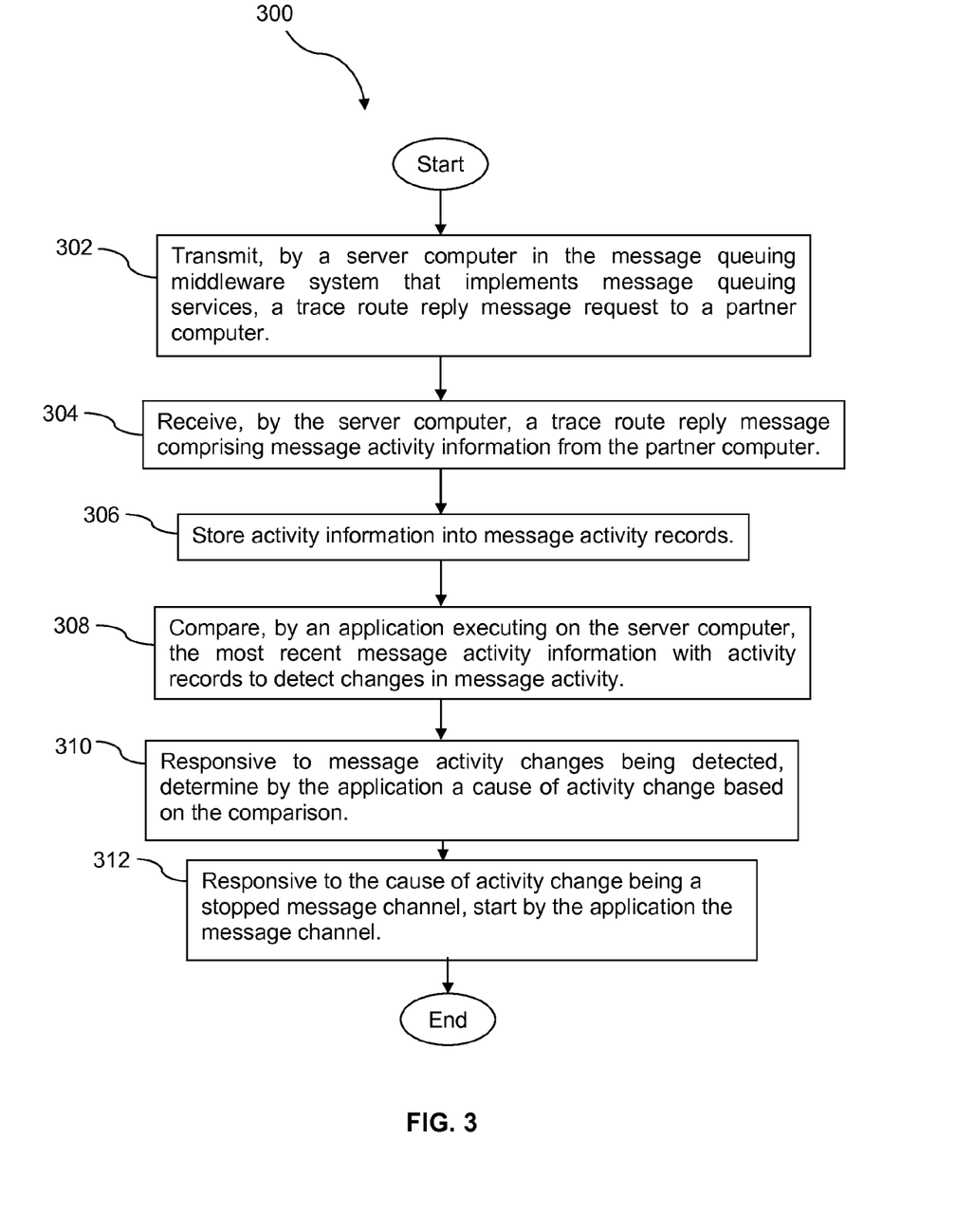
FIG. 3 is a flow chart illustrating another method according to an embodiment of the disclosure.

Turning now to FIG. 3, a method 300 is described. At block 302, a trace route message requesting a trace route reply message is transmitted by the monitor component 106 to the partner server 132. At block 304, a trace route reply message comprising message activity information is received at the application server 102 from the partner server 132. At block 306, activity information is stored into message activity records. At block 308, the most recent message activity information is compared with activity records to detect changes in message activity.

At block 310, responsive to message activity changes being detected, a cause of activity change is determined by the monitor component 106 based on the comparison. At block 312, responsive to the cause of activity change being a stopped message channel, the message channel is re restarted.

Figure 4:
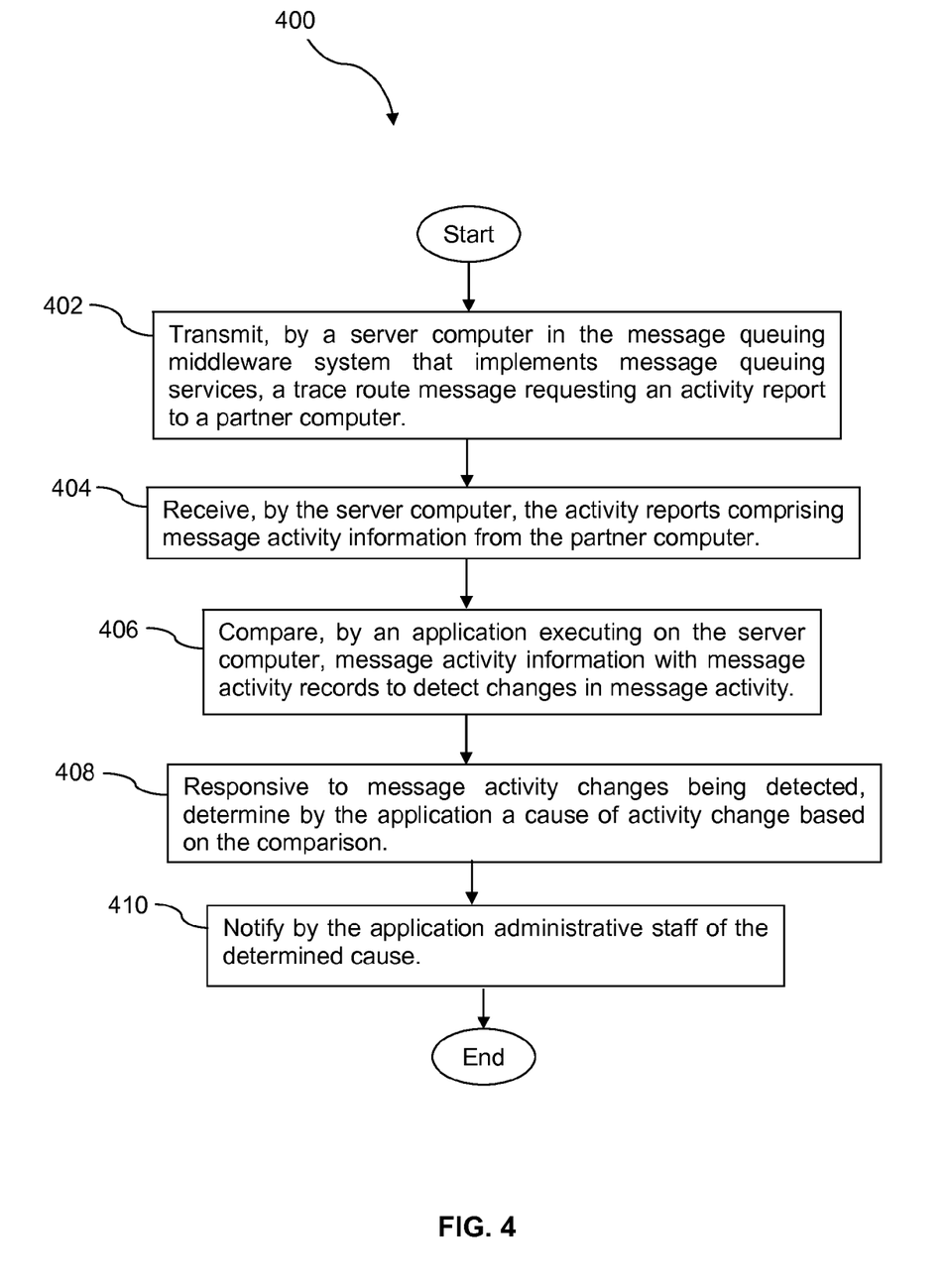
FIG. 4 is a flow chart illustrating a third method according to an embodiment of the disclosure.

Turning now to FIG. 4, a method 400 is described. At block 402, a trace route message is transmitted requesting activity reports to a partner computer by a server computer in a message queuing middleware system that implements various components to realize message queuing services. At block 404, the activity reports comprising message activity information are received from the partner computer. At block 406, message activity information is compared by an application executing on the server computer with message activity records to detect changes in message activity.

At block 408, responsive to message activity changes being detected, a cause of activity change is determined based on the comparison. At block 410, administrative staff is notified of the determined cause. For example, administrative staff associated with the cause of the activity change may be notified by the action component 108.

Figure 5:
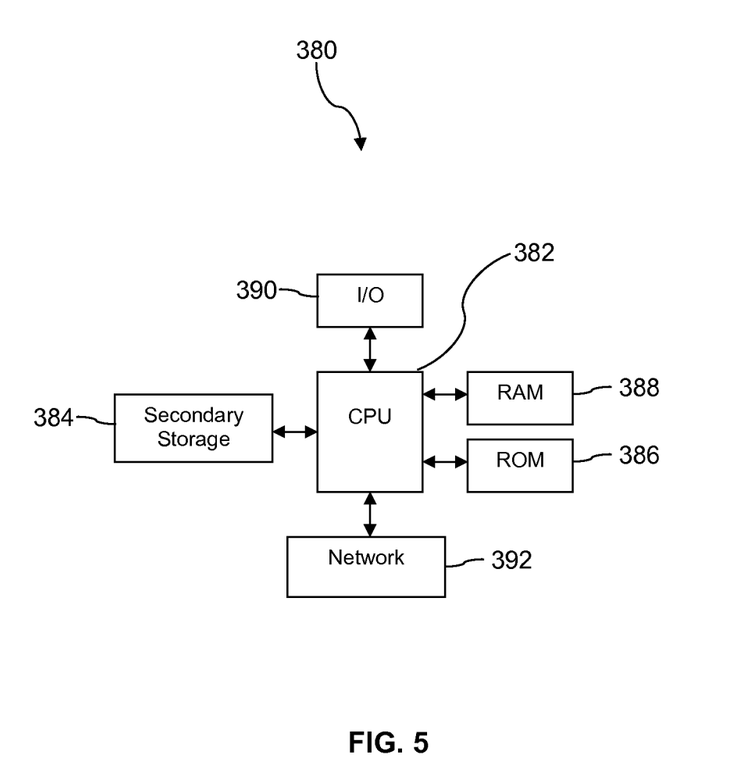
FIG. 5 is a block diagram of a computer system according to an embodiment of the disclosure.

FIG. 5 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design.

Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of trace route auditing and alarming for a message queuing middleware system, comprising:
    transmitting, by an application executing on a server computer in the message queuing middleware system that implements message queuing services, a trace route message for each of a plurality of remote queue definitions associated with a queue manager of the server computer requesting activity reports to a queue manager of a partner computer, wherein the application is stored in a memory of the server computer and is executed by a processor of the server computer;
    receiving, by a local queue of the queue manager of the server computer, the activity reports comprising message activity information from a transmission queue of the queue manager of the partner computer via a message channel agent;
    comparing, by the application, the most recent message activity information associated with the message queuing middleware system received from the transmission queue with message activity records associated with the message queuing middleware system to detect changes in message activity;
    responsive to message activity changes in the most recent message activity information associated with the message queuing middleware system being detected, determining, by the application, a cause of activity change within the message queuing middleware system based on the comparison; and
    performing, by the application, at least one of restarting a stopped message channel, resetting a message channel sequence number, resolving the message channel, or pinging the message channel based on the determined cause of activity change within the message queuing middleware system.

2. The method of claim 1, wherein the application examines the activity reports to determine where the trace route message has stopped in case of trace route message delivery error.

3. The method of claim 1, wherein the application automatically examines a list of remote queue definitions for a given queue manager and transmits trace route messages via the remote queue definitions.

4. The method of claim 3, wherein a monitor component of the application periodically pulls the list of remote queue definitions, works through the whole or partial list, calls trace route command, and tracks the trace route message.

5. The method of claim 4, wherein the monitor component examines status of each step along a transmission route of the trace route message and records the status in the message activity records.

6. The method of claim 3, wherein the application is run once a day in the morning to examine a list of remote queue definitions for a given queue manager.

7. The method of claim 1, wherein the component compares the most recent message activity information with message activity records for errors, traffic changes, and delay time differences.

8. A method of trace route auditing and alarming for a message queuing middleware system, comprising:
- transmitting, by an application executing on a server computer in the message queuing middleware system that implements message queuing services, a trace route message for each of a plurality of remote queue definitions associated with a queue manager of the server computer requesting a trace route reply message to a queue manager of a partner computer;
- receiving, by a local queue of the queue manager of the server computer, trace route reply messages comprising message activity information from a transmission queue of the queue manager of the partner computer via a message channel agent;
- storing the message activity information associated with the message queuing middleware system into message activity records;
- comparing, by the application, the most recent message activity information associated with the message queuing middleware system received from the transmission queue with previous message activity records associated with the message queuing middleware system to detect changes in message activity;
- responsive to message activity changes in the most recent activity information associated with the message queuing middleware system being detected, determining, by the application, a cause of activity change within the message queuing middleware system based on the comparison; and
- responsive to the cause of activity change within the message queuing middleware system being a stopped message channel, restarting, by the application, the message channel.

9. The method of claim 8, further comprising responsive to the comparison indicating that a channel sequence number is wrong, resetting the channel sequence number.

10. The method of claim 9, further comprising responsive to the message channel being still not operational, pinging the message channel.

11. The method of claim 10, further comprising responsive to the most recent message activity information indicating that the message channel entails to be resolved, resolving the message channel by forcing a commit or backing out the last batch of messages.

12. The method of claim 11, further comprising responsive to the cause of activity change being a non-resolvable message channel, rerouting the message channel.

13. The method of claim 12, wherein a map with alternative routes is built and referenced to for rerouting the message channel.

14. A method of trace route auditing and alarming for message queuing middleware, comprising:
- transmitting, by an application executing on a server computer in the message queuing middleware system that implements message queuing services, a trace route message for each of a plurality of remote queue definitions associated with a queue manager of the server computer requesting activity reports to a queue manager of a partner computer;
- receiving, by a local queue of the queue manager of the server computer, the activity reports comprising message activity information from a transmission queue of the partner computer via a message channel agent;
- comparing, by the application executing on the server computer, message activity information associated with the message queuing middleware system from the transmission queue with message activity records associated with the message queuing middleware system to detect changes in message activity;
- responsive to message activity changes in the most recent message activity information associated with the message queuing middleware system being detected, determining, by the application, a cause of activity change within the message queuing middleware system based on the comparison; and
- notifying, by the application, administrative staff associated with the message queuing middleware system of the determined cause.

15. The method of claim 14, further comprising when a message is not received by a destination queue manager, notifying corresponding remote administrative staff for queue manager issue.

16. The method of claim 14, further comprising when a remote queue manager receives a message but the message fails to be written to a remote side queue, notifying remote administrative staff of configuration issues.

17. The method of claim 14, further comprising when a message is written to a different destination queue than before, notifying the team associated with the current destination queue or recording it for future reference.

18. The method of claim 14, further comprising when a message fails to be placed into a local transmission queue, notifying administrative team for local configuration error.

19. The method of claim 14, further comprising when a message fails to be sent over a message channel, notifying administrative team of the message channel issue.

20. The method of claim 14, wherein an application is run once a day in the morning to examine a list of remote queue definitions for a given queue manager.

* * * * *